(12) United States Patent
Rawlins et al.

(10) Patent No.: US 7,767,778 B2
(45) Date of Patent: Aug. 3, 2010

(54) POLYURETHANE POWDER COATING COMPOSITIONS THAT DO NOT SPLIT OFF BLOCKING AGENTS AND HAVE A LOW STOVING TEMPERATURE

(75) Inventors: James Rawlins, Petal, MS (US);
Michael Grahl, Leverkusen (DE);
Dorota Greszta-Franz, Erkrath (DE);
Hans-Josef Laas, Bergisch Gladbach (DE); Reinhard Halpaap, Odenthal (DE)

(73) Assignee: Bayer MaterialScience AG, Leverkusen (DE)

( * ) Notice: Subject to any disclaimer, the term of this patent is extended or adjusted under 35 U.S.C. 154(b) by 835 days.

(21) Appl. No.: 11/094,589

(22) Filed: Mar. 30, 2005

(65) Prior Publication Data

US 2005/0222364 A1 Oct. 6, 2005

(30) Foreign Application Priority Data

Apr. 2, 2004 (DE) .................. 10 2004 017 005

(51) Int. Cl.
*C08G 18/80* (2006.01)
*C08G 18/22* (2006.01)
*C08G 18/42* (2006.01)
*C08G 18/58* (2006.01)

(52) U.S. Cl. .................... 528/45; 528/52; 528/55; 528/65; 528/272

(58) Field of Classification Search ............. 528/65, 528/272, 45, 51, 52, 55
See application file for complete search history.

(56) References Cited

U.S. PATENT DOCUMENTS

| 3,923,743 | A | 12/1975 | Quiring et al. ......... 260/75 NT |
| 4,044,171 | A | 8/1977 | Muller et al. ................. 427/27 |
| 4,413,079 | A | 11/1983 | Disteldorf et al. ........... 524/169 |
| 4,463,154 | A | 7/1984 | Disteldorf et al. ............. 528/45 |
| 4,483,798 | A | 11/1984 | Disteldorf et al. ........... 260/239 |
| 5,614,323 | A | 3/1997 | Chang .................... 428/425.8 |
| 5,621,064 | A | 4/1997 | Laas et al. .................... 528/60 |
| 5,847,044 | A | 12/1998 | Laas et al. .................. 524/590 |
| 6,613,861 | B2 | 9/2003 | Gras ........................... 528/45 |
| 6,908,980 | B2 | 6/2005 | Gras ........................... 528/73 |
| 6,916,897 | B2 | 7/2005 | Gras ........................... 528/73 |
| 2002/0095019 | A1 | 7/2002 | Gras ........................... 528/73 |
| 2003/0148130 | A1* | 8/2003 | Moens et al. ................ 428/482 |
| 2003/0153713 | A1* | 8/2003 | Spyrou et al. ................. 528/48 |
| 2003/0204040 | A1 | 10/2003 | Gras ........................... 528/44 |
| 2003/0208026 | A1 | 11/2003 | Gras ........................... 528/73 |
| 2004/0059082 | A1* | 3/2004 | Laas et al. .................... 528/65 |

FOREIGN PATENT DOCUMENTS

| CA | 2115763 | 3/1993 |
| EP | 1 137 689 B1 | 3/2003 |
| GB | 1 488 631 | 10/1977 |
| WO | 00/34355 | 6/2000 |

OTHER PUBLICATIONS

Metalloberfläche, No. 55, 6 (month unavailable) 2001, pp. 52-54, Michaela Gedan-Smolka et al, "Pulver bei niedrigeren Temperaturen aushärten".

* cited by examiner

*Primary Examiner*—Milton I Cano
*Assistant Examiner*—Benjamin J Gillespie
(74) *Attorney, Agent, or Firm*—Robert S. Klemz; Noland J. Cheung

(57) ABSTRACT

The present invention relates to polyurethane powder coating compositions that do not split off blocking agents and have a low stoving temperature. The powder coating compositions contain a hydroxyl functional binder component having a content of carboxyl groups of from 0.5 to 2.0 wt. %, a polyaddition compound, at least one zinc compound as a hardening catalyst, and a compound reactive to carboxyl groups.

12 Claims, No Drawings

POLYURETHANE POWDER COATING COMPOSITIONS THAT DO NOT SPLIT OFF BLOCKING AGENTS AND HAVE A LOW STOVING TEMPERATURE

BACKGROUND OF THE INVENTION

1. Field of the Invention

The present invention relates to polyurethane powder coating compositions that do not split off blocking agents and have a low stoving temperature, a process for their production, and their use for coating heat resistant substrates.

2. Description of the Prior Art

Under the pressure of ever more stringent environmental legislation, the development of powder coatings in addition to high-solids paints and aqueous coating systems has become increasingly important in recent years. Powder coatings do not release any harmful solvents during application, can be processed with a very high degree of material utilization, and are therefore considered to be particularly environmentally friendly and economic.

Qualitatively particularly high-grade, light-resistant and weather-resistant coatings can be produced with heat-hardenable powder coatings based on polyurethanes. The polyurethane (PUR) powder coatings currently established on the market are generally based on solid polyester polyols that are hardened with solid blocked aliphatic or cycloaliphatic polyisocyanates. These systems however have the disadvantage that the compounds used as blocking agents are split off during thermal crosslinking and largely escape. Accordingly, when they are processed special precautions have to be adopted, for technical reasons as well as for reasons of ecology and work safety, to purify the waste air and/or recover the blocking agent.

One possible way of avoiding the emission of blocking agents is to use the known PUR powder coating crosslinking agents containing uretdione groups (e.g. DE-A 2 312 391, DE-A 2 420 475, EP-A 0 045 994, EP-A 0 045 996, EP-A 0 045 998, EP-A 0 639 598 or EP-A 0 669 353). With these products the thermal reverse cleavage of uretdione groups into free isocyanate groups and their reaction with the hydroxy-functional binding agent is utilized as the crosslinking mechanism. However, in practice uretdione powder coating crosslinking agents have up to now been used only to a limited extent. The reason for this is the comparatively low reactivity of the internally blocked isocyanate groups, which requires stoving temperatures of at least 160° C.

Although it is known that the splitting-off of uretdione groups, in particular in the presence of reactants containing hydroxyl groups, occurs to a significant extent starting at about 100° C., the reaction in this temperature region still proceeds slowly, so that times of several hours, which are unrealistically long for a practical use, are necessary for the complete hardening of paint films. Although in DE-A 2 420 475, DE-A 2 502 934 or EP-A 0 639 598 temperatures starting at 110° C., and in DE-A 2 312 391 temperatures starting at 90° C., are mentioned as possible stoving conditions for uretdione group-containing powder coating systems, the specifically described examples of implementation show that sufficiently crosslinked coatings can also be obtained under reasonable stoving times of at most 30 minutes using the powder coatings described in these publications, but only starting at temperatures of 150° to 160° C. These publications do not give any information on how to prepare powder coatings that can in fact be completely hardened already at temperatures below 150° C. to 160° C. on a commercially feasible scale.

There has been no lack of attempts to accelerate the hardening of uretdione-crosslinking PUR powder coatings by the joint use of suitable catalysts. To this end various compounds have been proposed, for example, the organometallic catalysts known from polyurethane chemistry such as tin(II) acetate, tin(II) octoate, tin(II) ethylcaproate, tin(II) laurate, dibutyltin diacetate, dibutyltin dilaurate, dibutyltin maleate (e.g. EP-A 0 045 994, EP-A 0 045 998, EP-A 0 601 079, WO 91/07452 or DE-A 2 420 475), iron(III) chloride, zinc chloride, zinc 2-ethylcaproate and molybdenum glycolate; tertiary amines such as triethylamine, pyridine, methylpyridine, benzyldimethylamine, N,N-endoethylene-piperazine, N-methylpiperidine, pentamethyldiethylenetriamine, N,N-dimethylamino-cyclohexane and N,N'-dimethylpiperazine (e.g. EP-A 0 639 598); or N,N,N'-trisubstituted amidines, in particular bicyclic amidines such as 1,5-diazabicyclo[4.3.0]-non-5-ene (DBN) (e.g. EP-A 0 803 524).

Of these catalysts the aforementioned bicyclic amidines permit the lowest stoving temperatures. At the same time however they result in stoving yellowing (discolouration) that is unacceptably high for many areas of application. For this reason amidine-catalyzed uretdione systems have up to now not achieved a broad market penetration. In practice Lewis acids are generally used as catalysts, in particular organotin compounds of the aforementioned type. These compounds allow the formulation of uretdione powder coatings free of blocking agent that can fully react in a reliable and reproducible manner for example within 30 minutes at a temperature of 150° C. or, if shorter cycle times are desired, for example within 15 minutes at 180° C., to form coatings stable to yellowing and having good solvent resistance and elasticity.

Very special, complex powder coating formulations also permit a further reduction of the stoving temperature. According to the teachings of EP-B 1 137 689 Lewis acid catalysts, such as the previously mentioned tin or zinc compounds, are inhibited by acidic groups, such as carboxyl groups. Their full catalytic activity can therefore be manifested in a uretdione powder coating system only if the hydroxyl-functional binder that is used is free of carboxyl groups. For this reason a sufficient amount of an agent that is reactive to carboxyl groups, for example an epoxide, is added to the powder coatings described in this publication (which are based on conventional hydroxyl-functional binders, crosslinking agents containing uretdione groups, and special Lewis acid catalysts) in order to convert as completely as possible carboxyl groups that may still be present in the binder, and thereby remove them from the system. In this way the reactivity of the polyurethane powders can be increased to such an extent that the onset of hardening occurs starting at a temperature of about 120° C.

The increased reactivity of the acid-free catalyzed powder coatings is demonstrated in the examples of implementation of EP-B 1 137 689 exclusively by thin layer chromatography investigations. Results of paint-technology investigations are not disclosed. Our own experiments using real powder coating formulations confirm that, under the conditions mentioned in EP-B 1 137 689, i.e., using polyols having low acid numbers of at most 5 mg KOH/g and addition of a corresponding amount of an epoxide, crosslinked coatings can be obtained starting at a temperature of 120° C. However, these compositions exhibit a completely inadequate flow behavior, which is reflected in a strong surface structure and absence of gloss.

The possibility of increasing the reactivity of Lewis acid-catalyzed uretdione powder coatings by removing the inhibiting carboxyl group residue of the polyester resin by reaction with an epoxide, is also discussed in Metalloberfläche, No. 55

(2001), 6, pp. 52-54. This publication also refers to the fact that although completely hardened paint films can be obtained by using commercial powder coating resins and curing agents at a temperature of 130° C. and a stoving time of 30 minutes, they exhibit poor flow behavior. The unsatisfactory flow is in this case attributed to the use of commercial raw materials, which have been specially developed for stoving temperatures above 160° C. and are therefore not ideally suitable for low temperature applications.

An object of the present invention is to provide new PUR powder coatings that do not undergo splitting-off of blocking agents and are based on readily available, conventional binder components, that harden at just as low stoving temperatures and correspondingly short stoving times as the systems of EP-B 1 137 689 and therefore provide fully crosslinked paint films, but which despite the high reactivity exhibit very good surface properties, in particular an excellent flow behavior.

This object was achieved by the zinc-catalyzed uretdione powder coatings based on binders with a defined minimum content of carboxyl groups.

The present invention is based on the surprising observation that by using PUR powder coatings that do not undergo splitting-off of blocking agents and are based on uretdione powder coating crosslinking agents, conventional hydroxyl-functional binders, zinc catalysts and an at least equimolar amount, based on the carboxyl groups present in the system, of a compound reactive to carboxyl groups, elastic and solvent-resistant coatings having outstanding flow behavior can be obtained at temperatures starting at 110° C. if powder coating polyols with acid numbers of at least 6 mg KOH/g, i.e., with comparatively high residual contents of carboxyl groups, are used as binder; whereas, the use of binders free from or with low carboxyl group contents leads under otherwise identical conditions to the considerable flow disorders described above.

Although the presence of carboxyl groups reduces the catalytic activity of Lewis acids on uretdione crosslinking and the carboxyl group content thus has a significant influence on the reactivity and consequently the crosslinking temperature, the powder coating binders described in EP-B 1 137 689 are defined exclusively by their content of OH groups. There are no details of permitted maximum or indeed necessary minimum contents of carboxyl groups in the reaction system. The examples of implementation describe as binder component simply a polyester polyol with an acid number≦5 mg KOH/g as well as a practically acid-free polycaprolactone, and thus suggest the use of binders with as low an acid number as possible.

SUMMARY OF THE INVENTION

The present invention relates to polyurethane powder coating compositions containing A) a hydroxyl-functional binder component, which is solid below 40° C. and liquid above 130° C., has a content of carboxyl groups (calculated as COOH; molecular weight 45) of 0.5 to 2.0 wt. %, and contains
   A1) at least one polymeric polyol having an OH number of 15 to 200 mg KOH/g and a number average molecular weight (which can be calculated from the functionality and the hydroxyl content or determined by gel permeation chromatography) of 400 to 10,000 and
   A2) optionally at least one component containing at least one carboxyl group, B) a polyaddition compound which contains uretdione groups and optionally free isocyanate groups, is solid below 40° C. and liquid above 125° C., and is prepared from aliphatic and/or cycloaliphatic diisocyanates, C) at least one zinc compound as hardening catalyst, D) a compound which has a number average molecular weight of 200 to 5000 and contains groups reactive to carboxyl groups, and E) optionally additives known from powder coating technology, wherein i) components A) and B) are present in amounts such that 0.8 to 2.2 isocyanate groups of component B) are present for each hydroxyl group of component A), ii) the term isocyanate groups of component B) means the sum of isocyanate groups present in dimeric form as uretdione groups and free isocyanate groups, iii) components A) and D) are present in amounts such that 0.8 to 2.0 groups of component D) which are reactive to carboxyl groups are present for each carboxyl group of component A), iv) when aliphatic and/or cycloaliphatic dicarboxylic acids having 4 to 20 carbon atoms and/or aliphatic hydroxycarboxylic acids having 4 to 18 carbon atoms are present as component A2), the amount of components A2) and D) in the total amount of components A), B) and D) is less than 10 wt. % and v) the amount of component C) in the total amount of components A) to E) is 0.05 to 5 wt. %.

The present invention also relates to the use of this powder coating composition to coat heat-resistant substrates, i.e., those that at the stoving temperatures do not undergo undesirable physical changes (mechanical properties) or geometrical changes (shape).

DETAILED DESCRIPTION OF THE INVENTION

Component A) in the powder coatings according to the invention is a hydroxy-functional binder component which has a content of carboxyl groups (calculated as COOH; molecular weight 45) of 0.5 to 2.0 wt. %, is solid below 40° C. and liquid above 130° C. and contains at least one polymeric polyol A1) and optionally at least one component A2) containing at least one carboxyl group.

Suitable polymeric polyols A1) are the known hydroxyl group-containing binders from powder coating technology which have an OH number of 15 to 200 mg KOH/g, preferably 25 to 150 mg KOH/g, a number average molecular weight (which may be calculated from the functionality and the hydroxyl content) of 400 to 10,000, preferably 1000 to 5000. Polyol component A1) may contain up to 2.0 wt. %, preferably up to 1.6 wt. % and more preferably up to 1.2 wt. % of carboxyl groups.

Examples of polymeric polyols A1) include hydroxyl group-containing polyesters, polyacrylates or polyurethanes, such as those described e.g. in EP-A 0 045 998 or EP-A 0 254 152 (U.S. Pat. Nos. 4,463,154 and 4,900,800, respectively, herein incorporated by reference) as powder coating binding agents, and also mixtures of these resins. Preferably, polyol component A1) is a hydroxyl group-containing polyester having a softening point—determined by differential thermal analysis (DTA)—of 40° to 120° C., more preferably 45° to 110° C.

Optionally binder component A) of the powder coating compositions according to the invention may also contain carboxy-functional components A2). Suitable components A2) include aliphatic, cycloaliphatic, aromatic and/or heteroaromatic monobasic or polybasic carboxylic acids that contain up to 20 carbon atoms and may optionally be substituted, for example, by halogen atoms, and/or may be unsaturated.

Suitable carboxylic acids A2) include those having a number average molecular weight of 46 to 370, such as formic acid, acetic acid, propionic acid, butyric acid, valeric acid, caproic acid, caprylic acid, pelargonic acid, capric acid, undecanoic acid, lauric acid, tridecanoic acid, tetradecanoic acid, pentadecanoic acid, palmitic acid, stearic acid, isocosanoic acid, oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, the isomeric cyclohexane dicarboxylic acids, maleic acid, phenylethanoic acid, benzoic acid, phthalic acid, isophthalic acid, terephthalic acid, tetrahydrophthalic acid, trimellitic acid and the isomeric pyridine dicarboxylic acids.

Also suitable are hydroxycarboxylic acids such as tartaric acid, malic acid, citric acid or salicylic acid; oxocarboxylic acids such as pyruvic acid or acetoacetic acid and unsaturated carboxylic acids such acrylic acid, methacrylic acid, crotonic acid, isocrotonic acid, oleic acid, linoleic acid, linolenic acid, maleic acid, fumaric acid, citraconic acid or cinnamic acid.

Also suitable as components A2) are carboxy-functional polymers, in particular the polycarboxy polyesters and polycarboxy polyacrylates known as binders from powder coating technology, having an acid number of 10 to 150 mg KOH/g, preferably 30 to 60 mg KOH/g, as are described for example in DE-A 1 992 5543 on page 3, line 62, to page 4, line 58 (U.S. Pat. No. 6,342,576, herein incorporated by reference).

Particularly suitable carboxy-functional components A2) are saturated, monobasic or polybasic aliphatic and/or cycloaliphatic carboxylic acids having 4 to 20 carbon atoms and a melting point range of 40° to 160° C., the aforementioned polycarboxy polyesters and mixtures thereof. The aforementioned polycarboxy polyesters are most particularly preferred.

Polymeric polyols A1) and optional carboxy-functional components A2) are employed in the powder coatings according to the invention in amounts such that binder component A) contains 0.5 to 2.0 wt. %, preferably 0.6 to 1.6 wt. % and more preferably 0.8 to 1.2 wt. % of carboxyl groups. This means that the joint use of carboxy-functional components A2) is necessary if polymeric polyols A1) are used that contain less than 0.5 wt. %, preferably less than 0.6 wt. % and more preferably less than 0.8 wt. % of carboxyl groups.

From EP-B 0 744 421 it is known that powder coating compositions (which contain hydroxy-functional binders, crosslinking agents containing uretdione groups, low molecular weight dicarboxylic acids or hydroxycarboxylic acids and a crosslinking agent component containing groups reactive to carboxyl groups) harden to form completely matte paint films if the proportion of the dicarboxylic acids and/or hydroxycarboxylic acids and crosslinking agent component reactive to carboxyl groups in the total binder system (without auxiliary substances and additives) is at least 10 wt. %.

For the powder coating according to the invention this means that when aliphatic and/or cycloaliphatic dicarboxylic acids having 4 to 20 carbon atoms and/or aliphatic hydroxycarboxylic acid having 4 to 18 carbon atoms are present as components A2), the amount of components A2) and D) in the total amount of components A), B) and D) may be less than 10 wt. %, preferably at most 9 wt. % and more preferably at most 8 wt. %, to obtain glossy coatings.

In the powder coatings according to the invention the hydroxy-functional binders A) are combined with a crosslinking agent component B) reactive to hydroxyl groups. Component B) is selected from polyaddition compounds which are solid below 40° C. and liquid above 125° C., contain uretdione groups and optionally free isocyanate groups, and are prepared from aliphatic and/or cycloaliphatic diisocyanates, in particular 1,6-hexamethylene diisocyanate (HDI), 1-isocyanato-3,3,5-trimethyl-5-isocyanatomethyl-cyclohexane (isophorone diisocyanate, IPDI), 4,4'- and/or 4,2'-diisocyanato-dicyclohexylmethane, 1,3-diisocyanato-2 (4)-methylcyclohexane and mixtures thereof.

The production of these polyaddition compounds by reacting polyisocyanates containing uretdione groups with difunctional and optionally monofunctional compounds that are reactive to isocyanate groups, in particular dihydric and optionally monohydric alcohols, is known and described for example in DE-A 2 420 475, EP-A 0 045 996, EP-A 0 045 998, EP-A 0 639 598, EP-A 0 669 353, EP-A 1 024 158 or WO 04/005363. The polyaddition compounds suitable as component B) and containing uretdione groups and optionally free isocyanate groups generally have a content of uretdione groups (calculated as $C_2N_2O_2$, molecular weight=84) of 3 to 19 wt. % and a content of free isocyanate groups (calculated as NCO; molecular weight=42) of 0 to 6.0 wt. %. The melting point or melting point range of these compounds is generally within the temperature range from 40° to 125° C.

Polyaddition compounds containing uretdione groups that are particularly preferred as component B) are those that have a minimum content of carboxylic acid ester groups (calculated as $CO_2$; molecular weight=44) and/or carbonate groups (calculated as $CO_3$; molecular weight=60) of 1 wt. %. These particularly preferred polyaddition compounds containing uretdione groups are also known. They may be produced as described for example in EP-A 0 639 598, EP-A 1 024 158, EP-B 1 063 251 or WO 04/005363.

Component B) is used in the powder coating according to the invention in amounts such that 0.8 to 2.2, preferably 1.0 to 2.0 and more preferably 1.2 to 1.8 isocyanate groups of component B) are present for each hydroxyl group of binder component A). The term isocyanate groups of component B) is understood to denote the sum of isocyanate groups present in dimeric form as uretdione groups and free isocyanate groups.

In order to accelerate hardening the powder coating compositions according to the invention contain at least one zinc compound C) as hardening catalyst. Suitable catalysts C) are inorganic or organic zinc compounds, such as zinc oxide, zinc sulfide, zinc carbonate, zinc fluoride, zinc chloride, zinc bromide, zinc iodide, zinc phosphate, zinc borate, zinc titanate, zinc hexafluorosilicate, zinc sulfite, zinc sulfate, zinc nitrate, zinc tetrafluoroborate, zinc acetate, zinc octoate, zinc cyclohexanebutyrate, zinc laurate, zinc palmitate, zinc stearate, zinc behenate, zinc citrate, zinc gluconate, zinc acetylacetonate, zinc 2,2,6,6-tetramethyl-3,5-heptanedionate, zinc trifluoroacetate, zinc trifluoromethane-sulfonate, zinc dimethyldithiocarbamate and mixtures thereof.

Zinc acetylacetonate is preferred as catalyst C).

The zinc catalysts C) are used in the powder coating compositions according to the invention in an amount of 0.05 to 5 wt. %, preferably 0.1 to 3 wt. %, based on the total amount of components A) to E).

Component D) contained in the powder coating compositions according to the invention is selected from compounds containing groups reactive to carboxyl groups and having a number average molecular weight of 200 to 5000, preferably 200 to 2000 and more preferably 250 to 1000, such as those compounds known from powder coating technology as crosslinking agents for powder coating binders containing carboxyl groups.

Suitable components D) include the known polyepoxides such as triglycidyl isocyanurate (TGIC) and triglycidyl urazole or their oligomers; glycidyl ethers such as those based on bisphenol A; glycidyl-functional copolymers such as the known glycidyl methacrylates (GMA resins); glycidyl esters such as those prepared based on phthalic acid, terephthalic acid, trimellitic acid, tetrahydrophthalic acid and hexahydrophthalic acid; and mixtures thereof.

Suitable components D) also include compounds containing β-hydroxyalkylamide groups, such as those described in EP-A 0 322 834 as crosslinking agent components for carboxyl group-containing polyesters. The production of such β-hydroxyalkylamides is generally carried out by base-catalyzed reaction of organic polycarboxylic acid esters with β-hydroxyalkylamines at temperatures of up to 200° C. with the simultaneous distillative removal of the alcohol that is formed.

In the powder coating compositions according to the invention there are preferably used as component D) terephthalic acid diglycidyl ester, trimellitic acid triglycidyl ester, TGIC, β-hydroxyalkylamides based on saturated dicarboxylic acid esters with 4 to 12 carbon atoms in the dicarboxylic acid part and mixtures thereof. More preferably component D) contains a mixture of 70 to 82 wt. % of terephthalic acid diglycidyl ester and 18 to 30 wt. % of trimellitic acid triglycidyl ester.

Component D) is preferably used in the powder coating compostions according to the invention in amounts such that an at least equimolar amount of groups of component D) that are reactive to carboxyl groups is present for each carboxyl group of component A). When using polyol components A1) having a particularly low melt viscosity, for example, the reaction with a molar sub-stoichiometric amount of groups reactive to carboxyl groups may be sufficient to cancel the inhibiting effect of the carboxyl groups, with the result that the ratio of carboxyl-reactive groups to carboxyl groups in the powder coating compositions according to the invention may range from 0.8 to 2.0, preferably from 1.0 to 1.5 and more preferably from 1.0 to 1.3.

Optionally the powder coating compositions according to the invention may contain additives E) known from powder coating technology. These include known polyurethane catalysts, such as aluminium tri(ethyl acetoacetate), tin(II) hexanoate, tin(II) n-octanoate, tin(II) 2-ethyl-1-hexanoate, tin(II) ethylcaproate, tin(II) laurate, tin(II) palmitate, dibutyltin(IV) oxide, dibutyltin(IV) dichloride, dibutyltin(IV) diacetate, dibutyltin(IV) dimaleate, dibutyltin(IV) dilaurate, dioctyltin (IV) diacetate, molybdenum glycolate, 1,5-diazabicyclo [4.3.0]non-5-ene, 1,8-diazabicyclo[5.4.0]undec-7-ene and mixtures thereof.

A further class of catalysts that may optionally be jointly used are the conventional compounds known from the literature that are capable of accelerating the reaction of the carboxyl groups of component A) with the groups of component D) reactive to carboxyl groups. Examples include ammonium salts such as tetrabutylammonium chloride, bromide or iodide, tetraethylammonium chloride, bromide or iodide, tetramethylbenzylammonium chloride, dodecyldimethyl-(2-phenoxyethyl)ammonium bromide and diethyl-(2-hydroxyethyl)-methylammonium bromide; phosphonium salts such as tetrabutylphosphonium chloride, bromide or iodide, tetraethylphosphonium chloride, bromide or iodide, tetramethylphosphonium bromide, octadecyltributylphosphonium bromide and hexadecyltributylphosphonium bromide; catalysts with an imidazole structure such as imidazole, 2-methylimidazole, 2-methyl-4-ethylimidazole, 2-[(N-benzylanilino)-methyl]-2-imidazoline phosphate and 2-benzyl-2-imidazoline hydrochloride; and tertiary amines such as N,N-dimethylcyclohexylamine, N,N-diethylcyclohexylamine, N-methylpiperidine, N-methylmorpholine, pentamethyldiethylenetriamine, N,N'-dimethylpiperazine and 1,4-diazabicyclo[2.2.2]octane.

Preferred catalysts E) that may optionally be jointly used are ammonium salts and phosphonium salts of the aforementioned type.

If these additional catalysts E) are used at all, they are employed in an amount of up to 4 wt. %, preferably up to 2.4 wt. %, based on the total amount of components A) to E), provided that the total amount of all catalysts C) and optionally E) contained in the powder coating composition is 0.05 to 5 wt. %, preferably 0.1 to 3 wt. %, and provided that the proportion of the zinc catalysts C) in the total amount of C) and E) is at least 20 wt. %.

Further additives E) include flow improvers such as polybutyl acrylate or those based on polysilicones; light-protection agents such as sterically hindered amines, UV absorbers such as e.g. benztriazoles or benzophenones; pigments such as titanium dioxide; and also color stabilizers to protect against the danger of over-stoving discolouration such as trialkyl phosphites and/or triaryl phosphites optionally containing inert substituents, e.g., triethyl phosphite, triisodecyl phosplite, triphenyl phosphite or trisnonylphenyl phosphite.

In order to produce the finished powder coating composition the constituents A), B), C), D) and optionally E) are thoroughly mixed with one another and then combined in the melt to form a homogeneous material. This procedure may be carried out in suitable equipment, for example heatable kneaders, but is preferably carried out by melt extrusion, in which the extrusion temperature is chosen so that a maximum of shear forces acts on the mixture. In order to avoid a premature crosslinking of the powder coating composition, a temperature upper limit of 110° C. should not be exceeded. The order of the combination of the individual components A) to E) may largely be freely chosen in this process.

A method for producing a finished powder coating composition that is also preferred involves thoroughly mixing with one another, in a first step, only a part of the individual components, for example only components A) and C) or components B) and C) or components A), C) and D), in the melt, preferably during or immediately following the production of components A) or B), and only then adding at a later time, in a second step, the remaining components to the resultant storage-stable homogeneous material containing components A) and C) or components B) and C) or components A), C) and D), and then extruding the whole mixture jointly. With this type of production of powder coating compositions, in the case of the joint use of a component A2) containing carboxyl groups as a constituent of the binder component A), it is also possible to premix the individual components, i.e. polymeric polyol A1) and component A2) containing carboxyl groups, independently of one another with further powder coating constituents, and to combine only later, during the joint extrusion, all optionally premixed individual components with the binder component A). It is furthermore also possible to formulate concentrates (master batches) of formulation constituents, for example those of catalysts C) and/or crosslinking agent components D) and/or additives E) in one part of binder component A), and then to add these in the production of the powder coating composition to the remaining components to form a powder coating composition according to the invention.

Irrespective of the chosen method, the quantitative ratios of the individual components A), B), C) and D) are chosen such that 0.8 to 2.2, preferably 1.0 to 2.0 and more preferably 1.2 to 1.8 isocyanate groups of component B) are present for each hydroxyl group of binder component A) (the term isocyanate groups of component B) denoting the sum of isocyanate groups present in dimeric form as uretdione groups and free isocyanate groups), and 0.8 to 2.0, preferably 1.0 to 1.5 and more preferably 1.0 to 1.3 groups of component D) reactive to carboxyl groups are present for each carboxyl group of component A). In the case of the joint use of aliphatic and/or cycloaliphatic dicarboxylic acids with 4 to 20 carbon atoms and/or aliphatic hydroxycarboxylic acids with 4 to 18 carbon atoms as component A2), the proportion of components A2) and D) in the total amount of components A), B) and D) is less than 10 wt. %, preferably at most 9 wt. % and particularly preferably at most 8 wt. %. Hydroxyl groups optionally additionally contained in components B) and/or D) are disregarded when choosing the amounts of the individual components. The aforementioned NCO/OH equivalent ratio refers exclusively to the amount of component A) to component B).

The extruded mass is ground to a powder coating composition after cooling to room temperature and after an appropriate comminution, e.g. by chopping or rough grinding, is freed by screening from the grain fractions above the desired grain size, for example above 0.1 mm.

The powder coating formulations produced in this way may be applied by conventional powder application methods, such as electrostatic powder spraying or fluidized bed sintering, to the substrates to be coated. The coatings are hardened by heating to temperatures from 100° to 220° C., preferably from 110° to 160° C., which are low for polyurethane powder coating compositions, more preferably at temperatures from 120° to 150° C., for example, for a time ranging from about 5 to 60 minutes.

The PUR powder coating compositions according to the invention that do not undergo splitting-off of blocking agents and that contain, as binder, powder coating polyols with high residual contents of carboxyl groups of at least 0.5 wt. %, provide hard, elastic, solvent-resistant and chemical-resistant coatings at stoving temperatures starting from 100° C. that, despite the low stoving temperature, are characterised by outstanding optical properties, in particular a very good flow behavior and high gloss; whereas, uretdione powder coating compositions using low carboxyl content or carboxyl-free binders form under otherwise identical conditions coatings exhibiting considerable flow disorders and a strong surface structure.

According to the invention any suitable heat-resistant substrates may be coated, such as substrates of metals, glass, wood or heat-resistant plastics.

The following examples serve to describe the invention in more detail.

EXAMPLES

All parts and percentages, with the exception of the gloss values, are by weight.

Starting Compounds

Hydroxy-Functional Binder A)

Polyols A1)

A1-1 A hydroxyl group-containing polyester produced from 47.3 parts by weight of terephthalic acid, 44.6 parts by weight of neopentyl glycol, 2.9 parts by weight of adipic acid and 5.2 parts by weight of trimellitic anhydride.

OH number: 40 mg KOH/g
Acid number: 13 mg KOH/g
Carboxyl group content: 1.04%
Melting point range (DTA): 58° to 62° C.

A1-2) A hydroxyl group-containing polyester produced from 47.3 parts by weight of terephthalic acid, 44.6 parts by weight of neopentyl glycol, 2.9 parts by weight of adipic acid and 5.2 parts by weight of trimellitic anhydride.

OH number: 40 mg KOH/g
Acid number: 2 mg KOH/g
Carboxyl group content: 0.16%
Melting point range (DTA): 57° to 62° C.

A1-3) A hydroxyl group-containing polyester produced from 45.8 parts by weight of terephthalic acid, 37.5 parts by weight of neopentyl glycol, 4.6 parts by weight of 1,6-hexanediol, 0.7 part by weight of trimethylolpropane and 11.4 parts by weight of isophthalic acid.

OH number: 20 mg KOH/g
Acid number: 7 mg KOH/g
Carboxyl group content: 0.56%
Melting point range (DTA): 55° to 60° C.

A1-4) A hydroxyl group-containing polyester produced from 53.5 parts by weight of terephthalic acid, 41.2 parts by weight of neopentyl glycol, 2.8 parts by weight of 1,6-hexanediol, and 2.5 parts by weight of isophthalic acid.

OH number: 23 mg KOH/g
Acid number: 1 mg KOH/g
Carboxyl group content: 0.08%
Melting point range (DTA): 59° to 64° C.

Carboxyl Group-Containing Component A2)

A2-1) Dodecanedioic acid, acid number: 487 mg KOH/g, melting point 128° C.

A2-2) A carboxyl group-containing polyester produced from 47.4 parts by weight of terephthalic acid, 15.4 parts by weight of isophthalic acid, 32.7 parts by weight of neopentyl glycol, 4.1 parts by weight of hexanediol and 0.4 part by weight of trimethylolpropane.

Acid number: 35 mg KOH/g
Carboxyl group content: 2.81%
OH number: 3 mg KOH/g
Melting point range (DTA): 55° to 65° C.

Uretdione Group-Containing Polyaddition Compounds B)

Uretdione Group-Containing Component B1) (According to EP-A 0 639 598)

a) Production of a Diol Containing Ester Groups:

901 g of 1,4-butanediol and 1712 g of ε-caprolactone were mixed at room temperature under a nitrogen atmosphere, 0.3 g of tin(II) octoate were added, and the resulting mixture is then heated for 5 hours at 160° C. After cooling to room temperature a colorless, liquid product having the following characteristic data was obtained:

Viscosity (23° C.): 180 mPas
OH number: 416 mg KOH/g
Free caprolactone: 0.2%
Number average molecular weight (calculated from OH number): 269
Ester group content (calculated): 25.3% b) Production of Component B1) Containing Ester Groups and Uretdione Groups:

1000 g (4.05 equiv) of a polyisocyanate containing uretdione groups and prepared from 1-isocyanato-3,3,5-trimethyl-5-isocyanatomethylcyclohexane (IPDI) having a content of free isocyanate groups of 17.0% and a content of uretdione groups (determined by hot titration) of 20.7% were heated under dry nitrogen to 80° C. A mixture of 436 g (3.24 equiv) of the diol from a) containing ester groups and 105 g (0.81 equiv) of 2-ethyl-1-hexanol was then added and the whole was stirred at a reaction temperature of at most 105° C. until the NCO content of the reaction mixture had fallen after about 2 hours to a value of 0.4%.

The melt was poured onto a metal sheet to cool and a practically colorless solid resin having the following characteristic data was obtained:
NCO content: 0.4%
Uretdione group content: (calculated): 13.4%
Total NCO content (calculated): 13.8%
Monomeric IPDI: 0.09%
Melting point: 80° to 82° C.

Component B2) Containing Uretdione Groups (According to EP-A 1 024 158)

a) Production of a Diol Containing Ester Groups:

Diol C2) Containing Ester Groups 761 g of 1,3-propanediol and 1712 g of ε-caprolactone were mixed at room temperature under dry nitrogen, 0.3 g of tin(II) octoate were added, and the resulting mixture was then heated for 5 hours at 160° C. After cooling to room temperature a colorless liquid product having the following characteristic data was obtained:
Viscosity (23° C.): 190 mPas
OH number: 449 mg KOH/g
Free caprolactone: 0.3%
Mean molecular weight (calculated from OH number): 249
Ester group content (calculated): 26.7% b) Production of Component B2) Containing Ester Groups and Uretdione Groups:

0.1 g of dibutyltin(IV) dilaurate (DBTL) as catalyst were added under dry nitrogen to 1000 g (4.05 equiv) of the IPDI polyisocyanate containing uretdione groups described in the production of B1) and the whole was heated to 80° C. A mixture of 305 g (2.45 equiv) of the diol from a) containing ester groups and 30.4 g (0.80 equiv) of 1,3-propanediol was then added within 20 minutes and stirred at a reaction temperature of at most 115° C. until the NCO content of the reaction mixture had fallen after about 15 minutes to a value of 2.7%.

The melt was poured onto a metal sheet to cool, and a practically colorless solid resin with the following characteristic data was obtained:
NCO content (found/calculated): 2.7/2.5%
Uretdione group content: (calculated): 15.5%
Total NCO content (calculated): 18.0%
Monomeric IPDI: 0.18%
Melting point range: 94° to 100° C.

Catalysts C)
C1) Zinc acetylacetonate
C2) Zinc palmitate
C3) Zinc acetate
C4) Zinc oxide Components D) Reactive to Carboxyl Groups D1) Araldit® Posten 910, a commercial product from Huntsman Advanced Materials (Basle, Switzerland): a mixture of terephthalic acid diglycidyl ester (70 to 82 wt. %) and trimellitic acid triglycidyl ester (18 to 30 wt. %), epoxide equivalent 150 g/equiv epoxide group.

Example 1

According to the Invention and Comparison 48.2 parts by weight of hydroxyl group-containing polyester A1-1) having a content of carboxyl groups of 1.0% were thoroughly mixed with 16.0 parts by weight of polyaddition compound B1), corresponding to an equivalent ratio of total NCO to OH of 1.5:1, 1.0 part by weight of catalyst C1) (zinc acetylacetonate), 2.0 parts by weight of component D1) (Araldit® PT 910), corresponding to an equivalent ratio of carboxyl groups to groups reactive to carboxyl groups of 1.2:1, and as additives E)

1.0 part by weight of tetrabutylammonium bromide (further catalyst), 1.5 parts by weight of a commercially available flow improver (Resiflow® PV 88, Worlée Chemie, Hamburg, Germany)

0.3 parts by weight of benzoin and 30.0 parts by weight of a white pigment (Kronos® 2160, Titan, Leverkusen, Germany)

and then homogenized with the aid of a type PLK 46 Buss co-kneader at 150 rpm and a housing temperature of 40° C. in the inlet region as well as on the shaft, and 80° C. in the processing part; melt temperatures of 95° to 100° C. were reached. The solidified melt was ground using an ACM II classifier mill (Hosokawa Mikropul) with a 90 μm screen and sieved.

The gel time (determined according to DIN 55 990, Part 8, Point 5.1) of this powder coating composition according to the invention was about 50 sec at 180° C.

For purposes of comparison a powder coating composition was prepared using the same procedure from 49.5 parts by weight of low carboxyl group content, hydroxyl group-containing polyester A1-2) (content of carboxyl groups: 0.16%), 16.4 parts by weight of the polyaddition compound B1), 1.0 part by weight of catalyst C1) (zinc acetylacetonate), 0.3 part by weight of component D1) (Araldit® PT 910), 1.0 part by weight of tetrabutylammonium bromide, 1.5 parts by weight of the flow improver Resiflow® PV 88, 0.3 part by weight of benzoin and 30.0 parts by weight of the white pigment Kronos® 2160.

The equivalent ratio of total NCO to OH was 1.5:1, as in the previously described powder coating composition according to the invention, and the equivalent ratio of carboxyl-reactive groups to carboxyl groups was also 1.2:1. The gel time of this powder coating was also about 50 sec at 180° C.

The two powder coating compositions were sprayed with an ESB cup-type gun at a high voltage of 70 KV onto degreased steel sheets and hardened in each case for 30 minutes at a temperature of 120° C., 130° C. and 140° C. With layer thicknesses of about 55-60 μm the following coating properties were found:

|  | Powder coating composition according to the invention | | | Comparison | | |
|---|---|---|---|---|---|---|
|  | Stoving temperature | | | | | |
|  | 120° C. | 130° C. | 140° C. | 120° C. | 130° C. | 140° C. |
| Erichsen depression [mm][a] | 7.0 | >9.0 | >9.0 | 7.0 | >9.0 | >9.0 |
| Impact [in lbs][b] | 20 | >80 | >80 | 20 | >80 | >80 |
| Gloss[c] (20°/60°) | 77/94 | 77/95 | 82/96 | 32/55 | 34/57 | 35/58 |
| Visual assessed flow | very good | very good | very good | strong structure | strong structure | strong structure |
| Solvent resistance[d] | 50/0-1 | 50/0-1 | 50/0-1 | 50/0-1 | 50/0-1 | 50/0-1 |

[a] according to DIN EN ISO 1520
[b] according to ASTM D2794
[c] according to DIN 67530; 20° and 60° angle of reflection
[d] number of double rubs with acetone-impregnated cotton pad/evaluation (0=film intact, 1=film surface wetted, 2=film swollen down to the substrate, 3=film dissolved, m=matte, loss of gloss)

The comparison shows that both paints fully crosslink at a stoving temperature of 130° C. The powder coating composition according to the invention, which contains as binder the polyol A1-1) with a high residual content of carboxyl groups, provided a coating with very good flow behavior and high gloss, whereas the comparison composition, which was produced using the low carboxyl content polyol A1-2), formed under otherwise identical conditions a coating with a strong surface structure and consequently significantly reduced gloss.

Steel sheets sprayed with the powder coating composition according to the invention were in addition hardened at temperatures of 100° C., 110° C. and 120° C. for in each case 60 minutes. The following table shows the coating properties of the coatings obtained under these extremely mild conditions for polyurethane powder coatings:

|  | Powder coating composition according to the invention | | |
|---|---|---|---|
|  | 100° C. | 110° C. | 120° C. |
| Erichsen test [mm][a] | 3.0 | >9.0 | >9.0 |
| Impact [in lbs][b] | 20 | >80 | >80 |
| Gloss[c] (20°/60°) | 71/89 | 73/90 | 76/93 |
| Visually evaluated flow | very good | very good | very good |
| Solvent resistance[d] | 50/0-1 | 50/0-1 | 50/0-1 |

[a]-[d] see above

Examples 2-10

White pigmented powder coating compositions were produced according to the process described in Example 1 starting from various polyester polyols A1), and in some cases with the joint use of components A2) containing carboxyl groups, various powder coating crosslinking agents B) containing uretdione groups and various zinc catalysts C), and were sprayed using an ESB cup gun at a high voltage of 70 KV onto degreased steel sheets. Coatings 2 to 8 were then stoved in each case for 30 minutes at 130° C., and coatings 9 and 10 were stoved in each case for 30 minutes at 120° C. The following table shows the compositions (parts by weight) of the powder coating compositions as well as the coating properties of the coatings obtained therefrom (meaning of the footnotes [a]-[d] and evaluation as in Example 1).

The examples confirm that powder coating compositions 2 and 4 to 9 according to the invention, in which binder component A) contained at least 0.5 wt. % of carboxyl groups, lead to high-gloss, smooth-flowing coatings, whereas comparison compositions 3) and 10), which were based on low carboxyl group content binders, also formed crosslinked coatings, which however had a significantly lower gloss and exhibited marked flow disturbances (structure).

|  | Example | | | | | | | | |
|---|---|---|---|---|---|---|---|---|---|
|  | 2 | 3 Comparison | 4 | 5 | 6 | 7 | 8 | 9 | 10 Comparison |
| Polyester polyol A1-1) | — | — | — | — | 48.2 | 48.2 | 48.2 | 51.4 | — |
| Polyester polyol A1-2) | — | — | 48.3 | 40.3 | — | — | — | — | 52.6 |
| Polyester polyol A1-3) | 55.8 | — | — | — | — | — | — | — | — |
| Polyester polyol A1-4) | — | 55.6 | — | — | — | — | — | — | — |
| Dodecanedioic acid A2-1) | — | — | 0.7 | — | — | — | — | — | — |
| Carboxyl polyester A2-2) | — | — | — | 10.9 | — | — | — | — | — |
| Uretdione crosslinking agent B1) | 9.1 | 10.4 | 15.7 | 13.4 | 16.0 | 16.0 | 16.0 | — | — |
| Uretdione crosslinking agent B2) | — | — | — | — | — | — | — | 12.8 | 13.2 |
| Zinc acetylacetonate C1) | 1.0 | 1.0 | 1.0 | 1.0 | — | — | — | 1.0 | — |

-continued

| | Example | | | | | | | | |
|---|---|---|---|---|---|---|---|---|---|
| | 2 | 3 Comparison | 4 | 5 | 6 | 7 | 8 | 9 | 10 Comparison |
| Zinc palmitate C2) | — | — | — | — | 1.0 | — | — | — | — |
| Zinc acetate C3) | — | — | — | — | — | 1.0 | — | — | — |
| Zinc oxide C4) | — | — | — | — | — | — | 1.0 | — | — |
| Araldit ® PT 910 D1) | 1.3 | 0.2 | 1.5 | 1.6 | 2.0 | 2.0 | 2.0 | 2.0 | 0.4 |
| Tetrabutylammonium bromide | 1.0 | 1.0 | 1.0 | 1.0 | 1.0 | 1.0 | 1.0 | 1.0 | 1.0 |
| Resiflow ® PV 88 | 1.5 | 1.5 | 1.5 | 1.5 | 1.5 | 1.5 | 1.5 | 1.5 | 1.5 |
| Benzoin | 0.3 | 0.3 | 0.3 | 0.3 | 0.3 | 0.3 | 0.3 | 0.3 | 0.3 |
| Kronos ® 2160 | 30.0 | 30.0 | 30.0 | 30.0 | 30.0 | 30.0 | 30.0 | 30.0 | 30.0 |
| Carboxyl group content in A) [%] | 0.56 | 0.08 | 0.72 | 0.73 | 1.0 | 1.0 | 1.0 | 1.0 | 0.16 |
| Equivalent ratio NCO:OH | 1.5 | 1.5 | 1.5 | 1.5 | 1.5 | 1.5 | 1.5 | 1.5 | 1.5 |
| Equivalent ratio epoxide:COOH | 1.2 | 1.3 | 1.3 | 1.3 | 1.2 | 1.2 | 1.2 | 1.1 | 1.4 |
| Erichsen depression [mm]$^{a)}$ | >9.0 | >9.0 | >9.0 | >9.0 | >9.0 | >9.0 | >9.0 | >9.0 | >9.0 |
| Impact [in lbs]$^{b)}$ | >80 | >80 | >80 | >80 | >80 | >80 | >60 | >80 | >80 |
| Gloss$^{c)}$ (20°/60°) | 79/95 | 26/69 | 72/94 | 58/87 | 77/95 | 67/91 | 79/95 | 74/96 | 45/59 |
| Visually evaluated flow | very good | strong structure | very good | very good | very good | good | very good | very good | strong structure |
| Solvent resistance$^{d)}$ | 50/0-1 | 50/0-1 | 50/0-1 | 50/0-1 | 50/0-1 | 50/0-1 | 50/1-2 | 50/0 | 50/0-1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane powder coating composition comprising
A) a hydroxy-functional binder component which is solid below 40° C. and liquid above 130° C., and has a content of carboxyl groups (calculated as COOH; molecular weight 45) of 0.5 to 2.0 wt. %, and comprises
A1) at least one polymeric polyol having an OH number of 15 to 200 mg KOH/g and a number average molecular weight of 400 to 10,000 and
A2) optionally at least one compound containing at least one carboxyl group,
B) a polyaddition compound which contain uretdione groups and optionally free isocyanate groups, is solid below 40° C. and liquid above 125° C., and is prepared form at least one aliphatic and/or cycloaliphatic diisocyanate,
C) at least one zinc compound as hardening catalyst,
D) a compound which has a number average molecular weight of 200 to 5000 and contains groups reactive to carboxyl groups, and
E) optionally additives for powder coating compositions,
wherein i) components A) and B) are present in amounts such that 0.8 to 2.2 isocyanate groups of component B) are present for each hydroxyl group of component A), ii) the term isocyanate groups of component B) means the sum of isocyanate groups present in dimeric form as uretdione groups and free isocyanate groups, iii) components A) and D) are present in amounts such that 0.8 to 2.0 groups of component D) reactive to carboxyl groups are present for each carboxyl group of component A), iv) when aliphatic and/or cycloaliphatic dicarboxylic acids having 4 to 20 carbon atoms and/or aliphatic hydroxycarboxylic acids with 4 to 18 carbon atoms present as component A2), the amount of components A2) and D) in the total amount of components A), B) and D) is less than 10 wt. % and v) the amount of component C) in the total amount of components A) to E) is 0.05 to 5 wt. %.

2. The powder coating composition of claim 1 wherein component A1) comprises a hydroxyl group-containing polyester having a softening point of 40° to 120° C. as determined by differential thermal analysis (DTA), an OH number of 25 to 200 and a number average molecular weight of 1000 to 5000.

3. The powder coating composition of claim 1 wherein component A2) is present and comprises at least one monobasic or polybasic saturated aliphatic and/or cycloaliphatic carboxylic acid having 4 to 20 carbon atoms and/or a polycarboxy polyester.

4. The powder coating composition of claim 1 wherein component B) comprises a polyaddition compound which contains uretdione groups and optionally free isocyanate groups and is prepared from a compound comprising a member selected from the group consisting of hexamethylene diisocyanate, isophorone diisocyanate, 4,4'-diisocyanatodicyclohexyl-methane and 4,2'-disocyanatodicyclohexyl-methane.

5. The powder coating composition of claim 1 wherein component B) comprises a polyaddition compound which contains uretdione groups and optionally free isocyanate groups and has a minimum content of carboxylic acid ester groups (calculated as $CO_2$; molecular weight=44) and carbonate groups (calculated as $CO_3$; molecular weight=60) of 1 wt. %.

6. The powder coating composition of claim 1 wherein hardening catalyst C) comprises at least one organic zinc compound.

7. The powder coating composition of claim 1 wherein hardening catalyst C) comprises zinc acetylacetonate.

8. The powder coating composition of claim 1 wherein component D) comprises a polyepoxide or a β-hydroxyalkylamide.

9. The powder coating composition of claim 1 wherein component D) comprises a mixture of 70 to 82 wt. % of terephthalic acid diglycidyl ester and 18 to 30 wt. % of trimellitic acid triglycidyl ester.

10. The powder coating composition of claim 1 wherein component E) is present and comprises a tetraalkylammonium salt or a tetraalkylphosphonium salt.

11. The powder coating of claim 1 wherein i) components A) and B) are present in amounts such that 1.0 to 2.0 isocyanate groups of component B) are present for each hydroxyl group of component A), ii) components A) and D) are present in amounts such that 1.0 to 1.5 groups of component D) reactive to carboxyl groups are present for each carboxyl group of component A), iii) when aliphatic and/or cycloaliphatic dicarboxylic acids having 4 to 20 carbon atoms and/or aliphatic hydroxycarboxylic acids having 4 to 18 carbon atoms are present as component A2), the amount of components A2) and D) in the total amount of components A), B) and D) is at most 9 wt. % and iv) the amount of component C) in the total amount of components A) to E) is 0.1 to 3 wt. %.

12. A heat resistant substrate coated with the powder coating composition of claim 1.

* * * * *